(12) United States Patent
Tang et al.

(10) Patent No.: US 11,326,979 B2
(45) Date of Patent: May 10, 2022

(54) PUSH-SWING COMBINED WAVE GENERATOR

(71) Applicant: Shanghai Maritime University, Shanghai (CN)

(72) Inventors: Gang Tang, Shanghai (CN); Peng Lu, Shanghai (CN); Congqiang Tang, Shanghai (CN); Xiong Hu, Shanghai (CN)

(*) Notice: Subject to any disclaimer, the term of this patent is extended or adjusted under 35 U.S.C. 154(b) by 22 days.

(21) Appl. No.: 17/075,052

(22) Filed: Oct. 20, 2020

(65) Prior Publication Data
US 2021/0116327 A1  Apr. 22, 2021

(30) Foreign Application Priority Data
Oct. 21, 2019 (CN) .......................... 201911002954.5

(51) Int. Cl.
| | |
|---|---|
| *G01M 10/00* | (2006.01) |
| *G09B 9/06* | (2006.01) |
| *B63B 71/20* | (2020.01) |

(52) U.S. Cl.
CPC ............. *G01M 10/00* (2013.01); *B63B 71/20* (2020.01); *G09B 9/06* (2013.01); *G09B 9/066* (2013.01)

(58) Field of Classification Search
CPC ......... G01M 10/00; G09B 9/06; G09B 9/066; B63B 71/20
See application file for complete search history.

(56) References Cited

U.S. PATENT DOCUMENTS

| 490,484 A | * | 1/1893 | Mackaye | .................. A63J 5/00 |
| | | | | 472/82 |
| 2010/0158611 A1 | | 6/2010 | Demarteau | |

FOREIGN PATENT DOCUMENTS

| CN | 101713177 A | 5/2010 | |
| CN | 102183355 A | 9/2011 | |
| CN | 102221446 A | 10/2011 | |
| CN | 108918081 A | 11/2018 | |
| CN | 108978574 A | 12/2018 | |
| CN | 109060298 A | 12/2018 | |
| JP | 61145431 A | * 7/1986 | ............ G01M 10/00 |
| KR | 20190099583 A | 8/2019 | |
| WO | WO2020074012 | 4/2020 | |

* cited by examiner

*Primary Examiner* — Paul M. West
(74) *Attorney, Agent, or Firm* — Lei Jiang; Lei Jiang LLC (57) ABSTRACT

The present invention discloses a push-swing combined wave generator, comprising a wave-generating fixing bracket, a servo motor, a driving wheel, a connecting rod, a first hydraulic cylinder, a second hydraulic cylinder, a first hydraulic cylinder push rod, a second hydraulic cylinder push rod, and a wave-generating plate. The sliding pins arranged in the wave-generating plate slide in the axial direction, and are switchable to connect either the first hydraulic cylinder push rod or the second hydraulic cylinder push rod with the wave-generating plate, and thus to render the push-swing combined wave generator to operate in respective locked state or unlocked state. The present invention integrates pushing and swinging, is capable of implementing horizontal pushing and swinging wave generating modes respectively, generating various wave types, and meeting requirements of various forms of wave generating.

2 Claims, 11 Drawing Sheets

PUSH-SWING COMBINED WAVE GENERATOR

CROSS-REFERENCE TO RELATED APPLICATIONS

The subject application claims priority on Chinese patent application 201911002954.5 filed on Oct. 21, 2019, the contents and subject matter thereof being incorporated herein by reference.

FIELD OF INVENTION

The invention relates to the field of wave generating, in particular to a push-swing combined wave generator.

BACKGROUND ART

Waves are a natural phenomenon formed by the periodic undulating motion of sea water. Ships, engineering structures and harbor buildings traveling in the ocean will all be affected by waves and affect their stability. Therefore, studying the characteristics of waves is of great significance to the stability and reliability of ships and marine engineering structures. Due to geographical factors, the marine environment has a very high uncertainty, and conducting experiments outdoors may be dangerous. Therefore, researchers usually generate waves in a laboratory tank to simulate ocean waves, and then implement experimental operations, and the wave-generating equipment is indispensable experimental equipment for the simulation in the tank. There are two main types of wave generators: pusher type and swing type. Pusher type wave generators use the horizontal motion of the pusher plate to push the water body. The speed and displacement of the water body in front of the plate are the same, which is suitable for shallow water wave generating. In deep water area, the waves are mainly surface waves. Waves are only present at a certain depth on the water surface, and a swinging wave generator is required.

The Chinese invention patent with publication number CN108978574A discloses a combined push-swing wave generator, including a horizontal push device and a swing device. The horizontal push device consists of two sets of motor reducers, spur gears and racks, and the two racks are fixed. On the top plate of the swinging device, the motor reducer drives the rack to move in the same direction through a spur gear, realizing a horizontal push wave generation. The wave generator is in contact with the cam through a swing rod and a push rod, and the cam is connected to another motor reducer through a set of bevel gears. The motor reducer drives the wave generator to swing waves. The disclosure is driven by a rack and pinion, which is easily wearable, while wave generating precision is inaccurate. The Chinese invention patent with the publication number CN101713177A discloses a wave generator for generating simulated waves, including a base, a drive device, a linear guide set on the base, a movable carriage set on the linear guide, and the wave-propelling plate at the front end of the base and the push rods that are symmetrically arranged on both sides of the base and push the wave-generating plate to move under the action of the driving device to generate waves. The structure of the disclosure is complicated; wave generation in pushing mode is not easily controllable, while swing amplitude is difficult to adjust in swinging mode. The WIPO patent with publication number WO/2020/074012 discloses a wave generation testing apparatus using a hydraulically driven push plate under hyper gravity conditions, including a wave generation unit and a wave dissipation unit, with a wave generation hydraulic cylinder and a wave dissipation hydraulic cylinder respectively disposed at the left outer wall and the right outer wall of the model chamber. Two hydraulic drive systems outside of the model chamber provide hydraulic power respectively to the wave generation hydraulic cylinder and the wave dissipation hydraulic cylinder by means of a centrifuge rotary union. The hydraulic drive system thereof is complex, the form of force conversion is cumbersome, and only horizontal push wave generation is available. The Korean invention patent with publication number KR20190099583A discloses a wave generating device, including a first frame and a second frame. The device generates harmonic linear motion by connecting the output shaft of the driving speed reducing motor with an actuator, and then connects the output shaft of the actuator with the driving rod of the wave generating propeller via a hinge, converting linear motion into swing motion of the wave generating propeller and generates waves. The invention patent has poor performance of shock resistance, complex motion conversion, low transmission efficiency, and only swing wave generation is available.

Push and swing wave generators differ in wave-generating principles and wave form characteristics, and are employed in various experiment environments. Due to the complexity and diversity of experiment requirements, wave generators with a single motion can no longer meet the requirement for various forms of wave generation, while frequent replacement of wave generators will increase the cost of experiment. The traditional wave generator is directly driven by a driving cylinder, halting and bumpy movement inevitably results due to the opposite motion as it arrives at limit positions; thus smooth curve of motion is not easily obtainable. Although a few prior arts are capable of integrating pushing and swinging, they adopt superimposed and parallel schemes, and/or employ different driving schemes, resulting in a complicated and difficult to control structure.

SUMMARY OF THE INVENTION

In order to improve the performance of the prior art wave-generator, a push-swing combined wave generator is proposed. The technical solution is as follows: a wave-generating fixing bracket, a servo motor, a driving wheel, a connecting rod, a first hydraulic cylinder, a second hydraulic cylinder, a first hydraulic cylinder push rod, a second hydraulic cylinder push rod, and a wave-generating plate.

The wave-generating fixing bracket is L-shaped and consists of a bottom plate and a vertical plate. The bottom plate is horizontally arranged on the floor; the vertical plate is perpendicular to the bottom plate and has a rectangular notch arranged on the upper part of the vertical plate, with a depth of the rectangular notch being $1/5$-$1/2$ of the height of the vertical plate.

The servo motor is fixed on the upper part of the vertical plate and between the rectangular notch and a vertical side of the vertical plate, with a driving shaft thereof facing the rectangular notch. The driving wheel is arranged in the rectangular notch and is perpendicular to the vertical plate, with a rotating shaft in the center thereof connected with the driving shaft of the servo motor. A boss is arranged on the driving wheel, with the center of the boss being $1/2$-$9/10$ of the radius of the driving wheel distanced from the center of the driving wheel, and the diameter thereof being $1/30$-$1/10$ of the diameter of the driving wheel.

A through hole is arranged on each end of the connecting rod, with the boss of the driving wheel inserted into one of the holes to form a rotating pair.

The first hydraulic cylinder and the second hydraulic cylinder each is arranged on the vertical plate ⅛~½ of the height of the vertical plate distanced from the bottom plate, and ⅛-½ of the width of the vertical plate distanced from a respective side of the vertical plate. One end of the first hydraulic cylinder push rod is inserted in the first hydraulic cylinder, while the side surface of another end thereof away from the vertical plate is arranged with a rotating-pin through hole, a lower sliding-pin through hole and an upper sliding-pin through hole. The lower sliding-pin through hole and the upper sliding-pin through hole of the first hydraulic cylinder push rod are symmetrical in respect to the rotating-pin through hole thereof. One end of the second hydraulic cylinder push rod is inserted in the second hydraulic cylinder, while the side surface of another end thereof away from the vertical plate is arranged with a rotating-pin through hole, a lower sliding-pin through hole and an upper sliding-pin through hole. The lower sliding-pin through hole and the upper sliding-pin through hole of the second hydraulic cylinder push rod are symmetrical in respect to the rotating-pin through hole thereof.

A pair of first U-shaped bosses are arranged horizontally and symmetrically spacedly apart on the lower part of the wave-generating plate, with each first U-shaped boss having a rotating-pin through hole, a lower sliding-pin through hole and an upper sliding-pin through hole arranged there-through; the rotating-pin through hole of each first U-shaped boss corresponds and matches that on the first hydraulic cylinder push rod, the lower sliding-pin through hole of each first U-shaped boss corresponds and matches that on the first hydraulic cylinder push rod, and the upper sliding-pin through hole of each first U-shaped boss corresponds and matches that on the first hydraulic cylinder push rod. The end of the first hydraulic cylinder push rod away from the vertical plate is entrenched in the space between the two first U-shaped bosses; a rotating pin runs through the rotating-pin through holes of the two first U-shaped bosses and that of the first hydraulic cylinder push rod to form a rotating pair. A lower sliding pin and an upper sliding pin are simultaneously insertable into the lower sliding-pin through holes of the two first U-shaped bosses and that on the first hydraulic cylinder push rod and into the upper sliding-pin through holes of the two first U-shaped bosses and that on the first hydraulic cylinder push rod respectively, to form a sliding pair.

A pair of second U-shaped bosses are arranged horizontally and symmetrically spacedly apart on the lower part of the wave-generating plate, with each second U-shaped boss having a rotating-pin through hole, a lower sliding-pin through hole and an upper sliding-pin through hole arranged there-through. The rotating-pin through hole of each second U-shaped boss corresponds and matches that on the second hydraulic cylinder push rod, the lower sliding-pin through hole of each second U-shaped boss corresponds and matches that on the second hydraulic cylinder push rod, and the upper sliding-pin through hole of each second U-shaped boss corresponds and matches that on the second hydraulic cylinder push rod. The end of the second hydraulic cylinder push rod away from the vertical plate is entrenched in a space between the two second U-shaped bosses; a rotating pin runs through the rotating-pin through holes of the two second U-shaped bosses and that of the second hydraulic cylinder push rod to form a rotating pair; a lower sliding pin and an upper sliding pin are simultaneously insertable into the lower sliding-pin through holes of the two second U-shaped bosses and that on the second hydraulic cylinder push rod and into the upper sliding-pin through holes of the two second U-shaped bosses and that on the second hydraulic cylinder push rod respectively, to form a sliding pair.

The distance from the center line between the two first U-shaped bosses to the center line between the two second U-shaped bosses is equal to the distance between the center line of the first hydraulic cylinder and the center line of the second hydraulic cylinder.

A pair of third U-shaped bosses are arranged horizontally and symmetrically spacedly apart on the upper part of the wave-generating plate, with the center line between the two third U-shaped bosses corresponding with the center line of the wave-generating plate. Each third U-shaped boss has a rotating-pin through hole arranged there-through. Another end of the connecting rod away from the vertical plate is entrenched in the space between the two third U-shaped bosses. A rotating pin runs through the rotating-pin through holes of the two third U-shaped bosses and the through hole on the end of the connecting rod away from the vertical plate to form a rotating pair.

The driving wheel, the connecting rod, the wave-generating plate, the first cylinder push rod, and the second cylinder push rod satisfy the following condition: on a plane where the driving wheel is located, denoting the central axis of the driving wheel as A, denoting the central axis of the boss on the driving wheel as B, denoting the central axis of the hinged connection between the connecting rod and the wave-generating plate as C, and denoting the central axis of the hinged connection between either the first or the second hydraulic cylinder push rod and the wave-generating plate as D, then AB is always the shortest among AB, BC, CD, and AD, and the sum of AB with the longest among BC, CD, and AD is not less than the sum of the other two from BC, CD, and AD excluding the longest. As a matter of fact, under such a condition, AB, BC, CD, and AD constitute a four-bar mechanism.

The wave-generating fixing bracket is used to support and secure the push-swing combined wave generator.

The wave-generating plate generates various types of waves by translation or swinging.

The servo motor provides driving force for the push-swing combined wave generator.

The driving wheel is employed for transmitting the rotational force of the servo motor. The connecting rod is employed for converting the rotational force of the servo motor into a driving force for the wave-generating plate.

The first hydraulic cylinder and the second hydraulic cylinder provide horizontal driving force for the wave-generating plate. The first hydraulic cylinder push rod and the second hydraulic cylinder push rod respectively transmit the forces of the first hydraulic cylinder and the second hydraulic cylinder to the wave-generating plate.

The maximum swing angle of the wave-generating plate is determined by the following formula:

$$\Psi = \arccos\frac{L_{AD}^2 + L_{CD}^2 - (L_{AB} + L_{BC})^2}{2L_{AD}L_{CD}} - \arccos\frac{L_{AD}^2 + L_{CD}^2 - (L_{BC} - L_{AB})^2}{2L_{AD}L_{CD}}$$

When the lengths of AB, BC, and CD are fixed, the maximum swing angle of the wave-generating plate in the swing mode is determined by the length of AD.

In a typical scenario, the push-swing combined wave generator of the present invention is placed in a wave-generating pool, with multiple sensors arranged in the wave-generating pool for collecting real time wave data, such as wave heights. The push-swing combined wave generator of the present invention further comprises a computer, a controller for controlling the servo motor, a first hydraulic controlling component for controlling the first hydraulic cylinder, and a second hydraulic controlling component for controlling the second hydraulic cylinder. The collected wave data are transmitted to the computer. The computer processes the wave data and issues corresponding instructions to the servo motor controller, the first hydraulic controlling component, and the second hydraulic controlling component to take appropriate actions for adjusting wave generation.

For wave generation in shallow water, horizontal push is generally preferred. In such a scenario, switch the sliding pins of the wave-generating plate to the locked state (that is, the sliding pins are inserted into the respective sliding-pin through holes), so that the first hydraulic cylinder push rod and the second hydraulic cylinder push rod are fixedly connected with the wave-generating plate. The computer processes the wave data and issues instructions accordingly to the servo motor controller to take action to drive the servo motor, the servo motor then drives the driving wheel to rotate, the driving wheel drives the connecting rod to move, and the connecting rod pushes the wave-generating plate to perform a reciprocating and translational motion to generate waves.

For wave generation in deep water, swinging is preferred. In such a scenario, the computer issues instructions to the first hydraulic controlling component to control the first hydraulic cylinder and simultaneously to the second hydraulic controlling component to control the second hydraulic cylinder, so that the first hydraulic cylinder push rod and the second hydraulic cylinder push rod remain stationary. The computer subsequently calculates the length of AD. Next, the sliding pins of the wave-generating plate are switched to an unlocked state (that is, they are plugged out of the respective sliding-pin through holes), so that the wave-generating plate is capable to rotate. Subsequently, the computer processes the wave data and issues instructions accordingly to the servo motor controller to take action to drive the servo motor, and the servo motor drives the driving wheel to rotate, the driving wheel drives the connecting rod to move, and the connecting rod pushes the wave-generating plate to rotate around the rotating pin of the wave-generating plate to perform reciprocating swing movement. For various positions of the first hydraulic cylinder push rod and the second hydraulic cylinder push rod, the wave-generating plate will generate waves with various swing amplitudes.

For horizontal push wave generation, in addition to the pushing force from the connecting rod, the wave-generating plate also receives force from the first hydraulic cylinder push rod and the second hydraulic cylinder push rod. With the coupled exertion of force from the two push rods, an increased driving force is obtained.

Thus, by controlling the frequency, speed and stroke of the motion of the wave-generating plate, waves with various wave heights, wavelengths, and periods are generated.

Compared with the prior art, the present invention possesses the following beneficial effects:

1. The present invention integrates pushing and swinging in wave generation, implements horizontal push and swing wave generation to generate various wave types in meeting various requirements for wave generation and for wave simulation in various scenarios.

2. The present invention enjoys a simple structure, realized by means of hydraulic cylinder plus connecting rod mechanism. Force conversion is simple and reliable, operation is easy, and is conducive to automatic control and maintenance.

3. The present invention enjoys high transmission efficiency, high precision, and produces smooth wave generation curves.

4. Frequency and amplitude of wave generation of the present invention are easily adjustable, while the structure of the wave generator of the present invention is reliable and highly stable.

BRIEF DESCRIPTION OF THE DRAWINGS

The present invention will be further expounded in conjunction with the accompanying drawings.

Reference signs are as follows: 1—wave-generating fixing bracket, 3—servo motor, 4—driving wheel, 5—connecting rod, 8—first hydraulic cylinder, 9—second hydraulic cylinder, 10—first hydraulic cylinder push rod, 11—second hydraulic cylinder push rod, 12—wave-generating plate, 120— first U-shaped boss, 121—second U-shaped boss, 122—third U-shaped boss, 13—rotating pin, 140—lower sliding pin, 141—upper sliding pin, 21—wave generator, 22—sensor, 23—computer, 24—wave generator.

EMBODIMENTS

The push-swing combined wave generator will be described in further detail with reference to the drawings and the specific embodiments. In combination with the accompanying drawings and descriptions hereunder, the advantages and features of the present invention will become clear.

The present invention discloses a push-swing combined wave generator, which implements horizontal push and swing wave-generating modes in generating various wave types.

Figure 1:
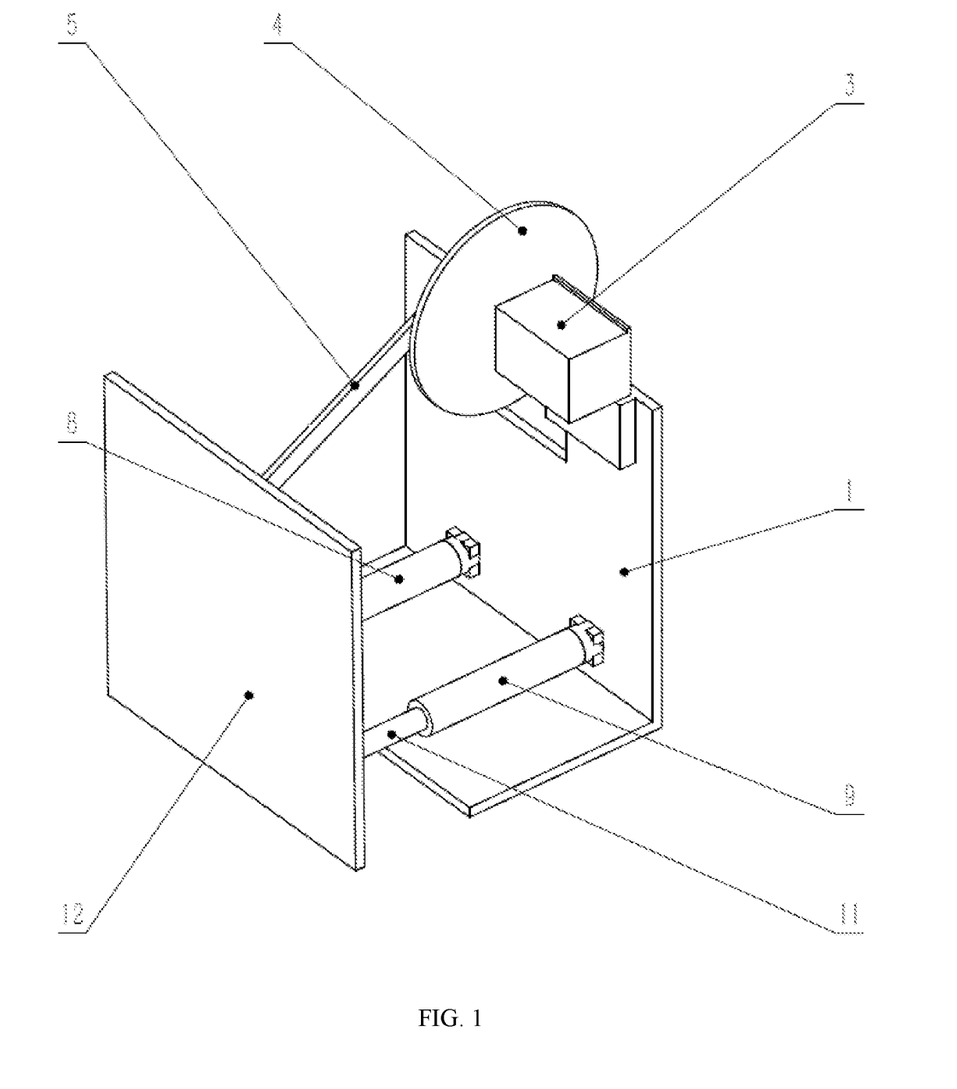
FIG. 1 is a schematic diagram of the isometric structure of the push-swing combined wave generator of the present invention.
Figure 2:
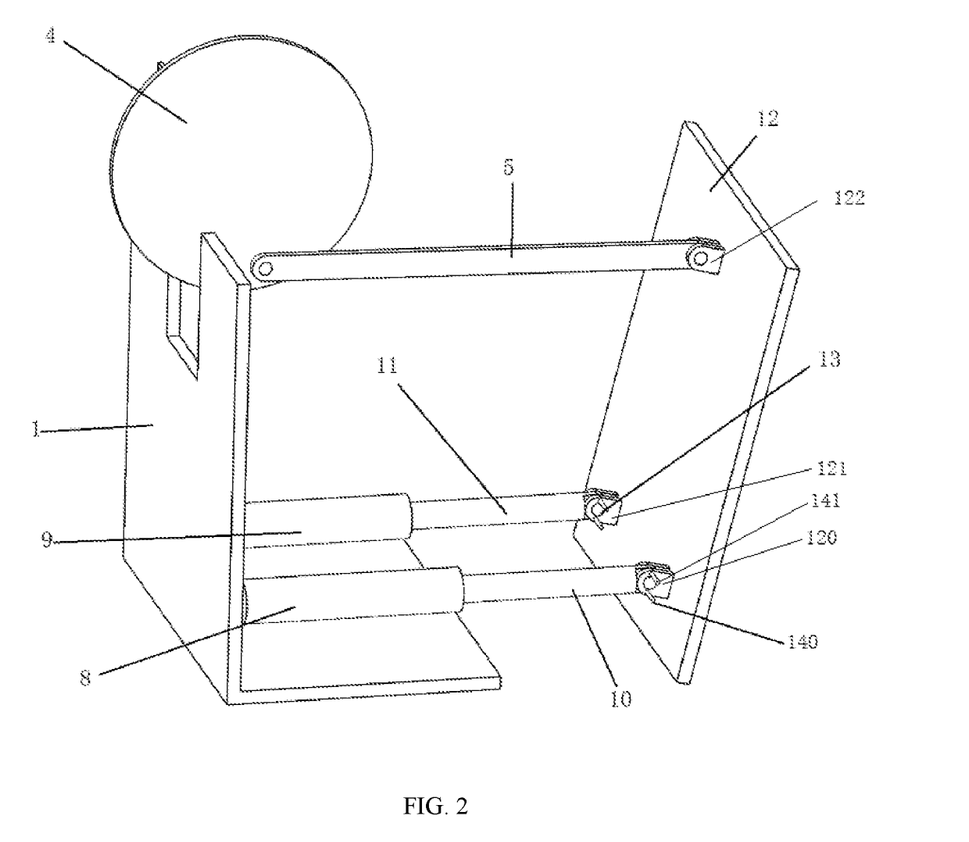
FIG. 2 is a schematic diagram of the push-swing combined wave generator of the present invention in swing mode.

A push-swing combined wave generator, as shown in FIGS. 1 and 2, comprising a wave-generating fixing bracket 1, a servo motor 3, a driving wheel 4, a connecting rod 5, a first hydraulic cylinder 8, a second hydraulic cylinder 9, a first hydraulic cylinder push rod 10, a second hydraulic cylinder push rod 11, and a wave-generating plate 12;

the wave-generating fixing bracket 1 is L-shaped and consists of a bottom plate and a vertical plate;

The bottom plate is horizontally arranged on a floor; the vertical plate is perpendicular to the bottom plate and has a rectangular notch arranged on the upper part of the vertical plate, with the depth of the rectangular notch being ⅕-½ of the height of the vertical plate.

The servo motor 3 is fixed on the upper part of the vertical plate and between the rectangular notch and a vertical side of the vertical plate, with a driving shaft thereof facing the rectangular notch.

The driving wheel 4 is arranged in the rectangular notch and is perpendicular to the vertical plate, with a rotating shaft in the center thereof connected with the driving shaft of the servo motor 3.

A boss is arranged on the driving wheel 4, with the center of the boss being ½-9/10 of the radius of the driving wheel distanced from the center of the driving wheel, and the diameter thereof being 1/30-1/10 of the diameter of the driving wheel 4.

A through hole is arranged on each end of the connecting rod 5, with the boss of the driving wheel 4 inserted into one of the through holes to form a rotating pair.

The first hydraulic cylinder 8 and the second hydraulic cylinder 9 each is arranged on the vertical plate ⅛~½ of the height of the vertical plate distanced from the bottom plate, and ⅛~½ of the width of the vertical plate distanced from a respective side of the vertical plate. One end of the first hydraulic cylinder push rod 10 is inserted in the first hydraulic cylinder 8, while the side surface of another end thereof away from the vertical plate is arranged with a rotating-pin through hole, a lower sliding-pin through hole and an upper sliding-pin through hole. The lower sliding-pin through hole and the upper sliding-pin through hole of the first hydraulic cylinder push rod 10 are symmetrical in respect to the rotating-pin through hole thereof. One end of the second hydraulic cylinder push rod 11 is inserted in the second hydraulic cylinder 9, while the side surface of another end thereof away from the vertical plate is arranged with a rotating-pin through hole, a lower sliding-pin through hole and an upper sliding-pin through hole. The lower sliding-pin through hole and the upper sliding-pin through hole of the second hydraulic cylinder push rod 11 are symmetrical in respect to the rotating-pin through hole thereof.

Figure 4:
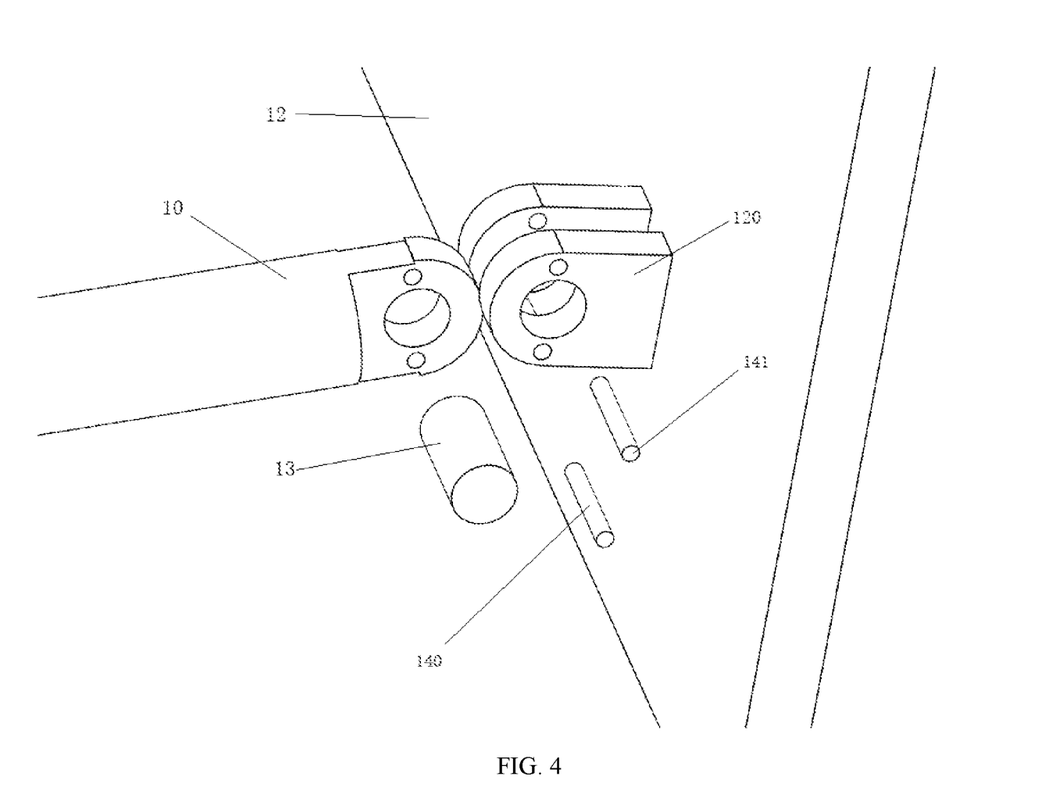
FIG. 4 is a partial exploded view of the connection between the first hydraulic cylinder push rod and the wave-generating plate of the push-swing combined wave generator of the present invention.

As shown in FIGS. 1 and 4, a pair of first U-shaped bosses 120 are arranged horizontally and symmetrically spacedly apart on the lower part of the wave-generating plate 12, with each first U-shaped boss 120 having a rotating-pin through hole, a lower sliding-pin through hole and an upper sliding-pin through hole arranged there-through. The rotating-pin through hole of each first U-shaped boss 120 corresponds and matches that on the first hydraulic cylinder push rod 10, the lower sliding-pin through hole of each first U-shaped boss 120 corresponds and matches that on the first hydraulic cylinder push rod 10, and the upper sliding-pin through hole of each first U-shaped boss 120 corresponds and matches that on the first hydraulic cylinder push rod 10. The end of the first hydraulic cylinder push rod 10 away from the vertical plate is entrenched in the space between the two first U-shaped bosses 120. A rotating pin 13 runs through the rotating-pin through holes of the two U-shaped bosses 120 and that of the first hydraulic cylinder push rod 10 to form a rotating pair; a lower sliding pin 140 and an upper sliding pin 141 are insertable simultaneously into the lower sliding-pin through holes of the two first U-shaped bosses 120 and that on the first hydraulic cylinder push rod 10 and into the upper sliding-pin through holes of the two first U-shaped bosses 120 and that on the first hydraulic cylinder push rod 10 respectively, to form a sliding pair.

Figure 5:
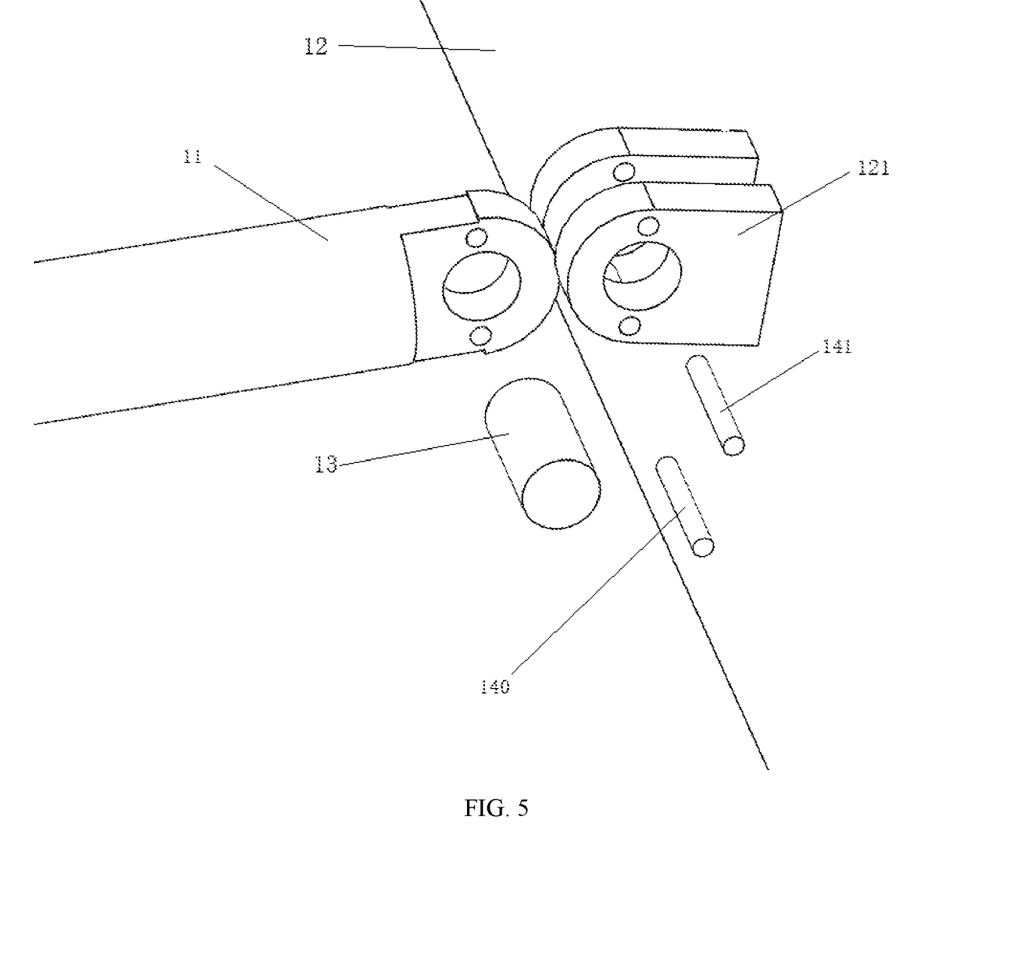
FIG. 5 is a partial exploded view of the connection between the second hydraulic cylinder push rod and the wave-generating plate of the push-swing combined wave generator of the present invention.

As shown in FIGS. 1 and 5, a pair of second U-shaped bosses 121 are arranged horizontally and symmetrically spacedly apart on the lower part of the wave-generating plate 12, with each second U-shaped boss 121 having a rotating-pin through hole, a lower sliding-pin through hole and an upper sliding-pin through hole arranged there-through; the rotating-pin through hole of each second U-shaped boss 121 corresponds and matches that on the second hydraulic cylinder push rod 11, the lower sliding-pin through hole of each second U-shaped boss 121 corresponds and matches that on the second hydraulic cylinder push rod 11, and the upper sliding-pin through hole of each second U-shaped boss 121 corresponds and matches that on the second hydraulic cylinder push rod 11. The end of the second hydraulic cylinder push rod 11 away from the vertical plate is entrenched in the space between the two second U-shaped bosses 121. A rotating pin runs through the rotating-pin through holes of the two second U-shaped bosses 121 and that of the second hydraulic cylinder push rod 11 to form a rotating pair. A lower sliding pin 140 and an upper sliding pin 141 are insertable ensemble into the lower sliding-pin through holes of the two second U-shaped bosses 121 and that on the second hydraulic cylinder push rod 11 and into the upper sliding-pin through holes of the two second U-shaped bosses 121 and that on the second hydraulic cylinder push rod 11 respectively, to form a sliding pair.

The distance from the center line between the two first U-shaped bosses 120 to the center line between the two second U-shaped bosses 121 is equal to the distance between the center line of the first hydraulic cylinder 8 and the center line of the second hydraulic cylinder 9.

Figure 6:
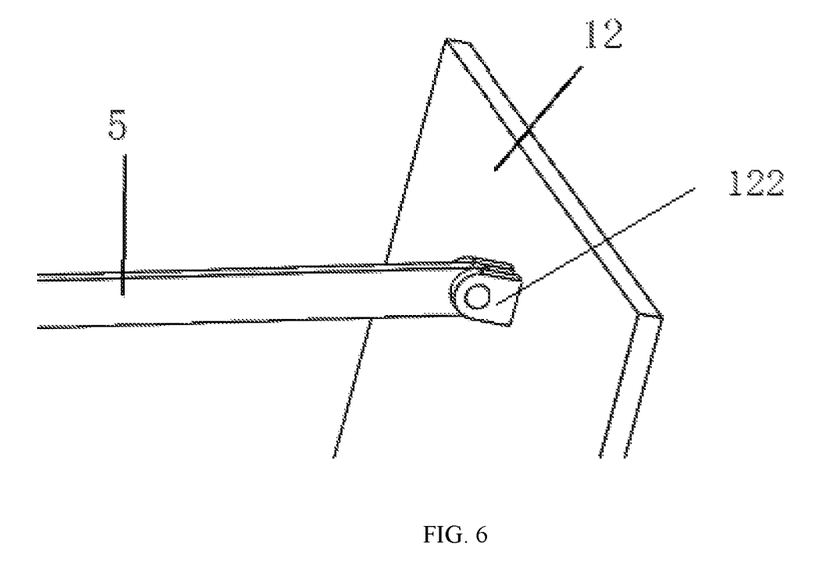
FIG. 6 is a partial exploded view of the connection between the connecting rod and the wave-generating plate of the push-swing combined wave generator of the present invention.

As shown in FIG. 6, a pair of third U-shaped bosses 122 are arranged horizontally and symmetrically spacedly apart on the upper part of the wave-generating plate 12, with the center line between the two third U-shaped bosses 122 corresponding with the center line of the wave-generating plate 12. Each third U-shaped boss 122 has a rotating-pin through hole arranged there-through; another end of the connecting rod 5 away from the vertical plate is entrenched in the space between the two third U-shaped bosses 122. A rotating pin runs through the rotating-pin through holes of the two third U-shaped bosses 122 and the through hole on the end of the connecting rod 5 away from the vertical plate to form a rotating pair.

The wave-generating fixing bracket 1 supports and secures the push-swing combined wave generator.

The wave-generating plate 12 generates various types of waves by means of swinging or pushing.

The servo motor 3 provides driving force for the push-swing combined wave generator.

The driving wheel 4 is employed for transmitting the rotational force of the servo motor 3; the connecting rod 5 is employed for converting the rotational force of the servo motor 3 into driving force for the wave-generating plate 12.

The first hydraulic cylinder 8 and the second hydraulic cylinder 9 provide horizontal driving force for the wave-generating plate 12; the first hydraulic cylinder push rod 10 and the second hydraulic cylinder push rod 11 respectively transmit the forces of the first hydraulic cylinder 8 and the second hydraulic cylinder 9 to the wave-generating plate 12.

In a typical scenario, the wave-generating fixing bracket 1 is placed in a pool or other wave-generating sites; the servo motor 3 is fixed on the wave-generating fixing bracket 1.

Figure 3:
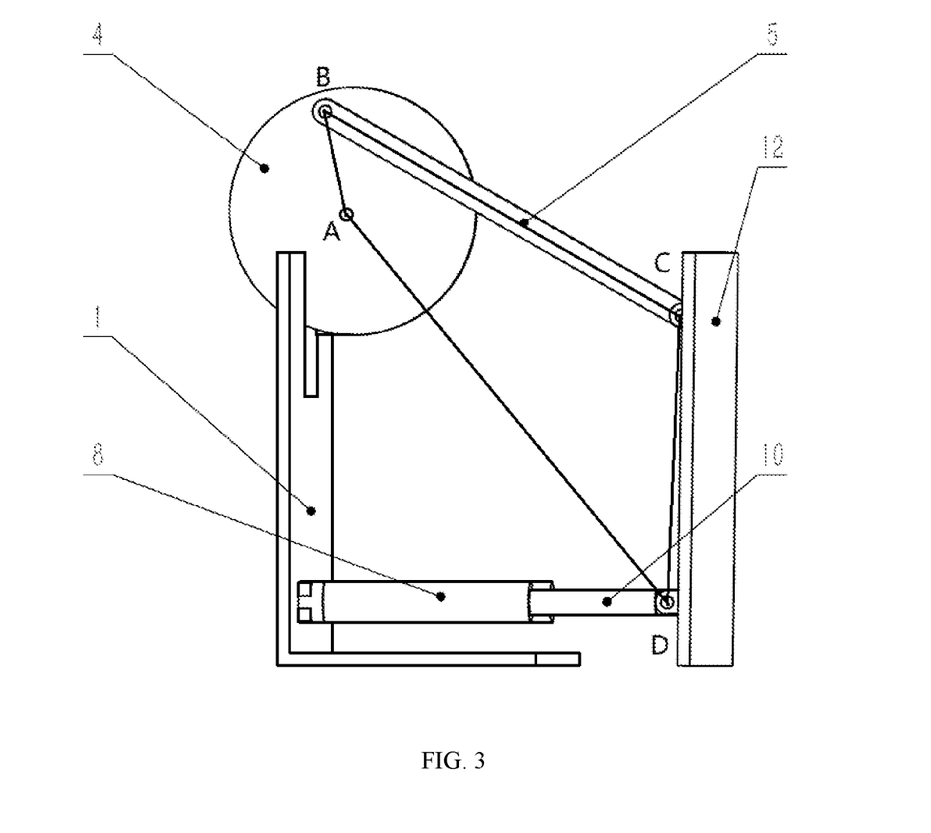
FIG. 3 is a schematic diagram of the push-swing combined wave generator of the present invention in push mode.

Further, as shown in FIG. 3, the driving wheel 4, the connecting rod 5, the wave-generating plate 12, the first cylinder push rod 10, and the second cylinder push rod 11 satisfy the following condition: on the plane where the driving wheel 4 is located, denoting the central axis of the driving wheel 4 as A, denoting the central axis of the boss on the driving wheel 4 as B, denoting the central axis of the hinged connection between the connecting rod 5 and the wave-generating plate 12 as C, and denoting the central axis of the hinged connection between either the first or the second hydraulic cylinder push rod 10, 11 and the wave-generating plate 12 as D, then AB is always the shortest among AB, BC, CD, and AD, and the sum of AB with the longest among BC, CD, and AD is not less than the sum of the other two from BC, CD, and AD excluding the longest among BC, CD, and AD.

The maximum swing angle of the wave-generating plate is determined by the following formula:

$$\Psi = \arccos\frac{L_{AD}^2 + L_{CD}^2 - (L_{AB} + L_{BC})^2}{2L_{AD}L_{CD}} - \arccos\frac{L_{AD}^2 + L_{CD}^2 - (L_{BC} - L_{AB})^2}{2L_{AD}L_{CD}}$$

Figure 9:
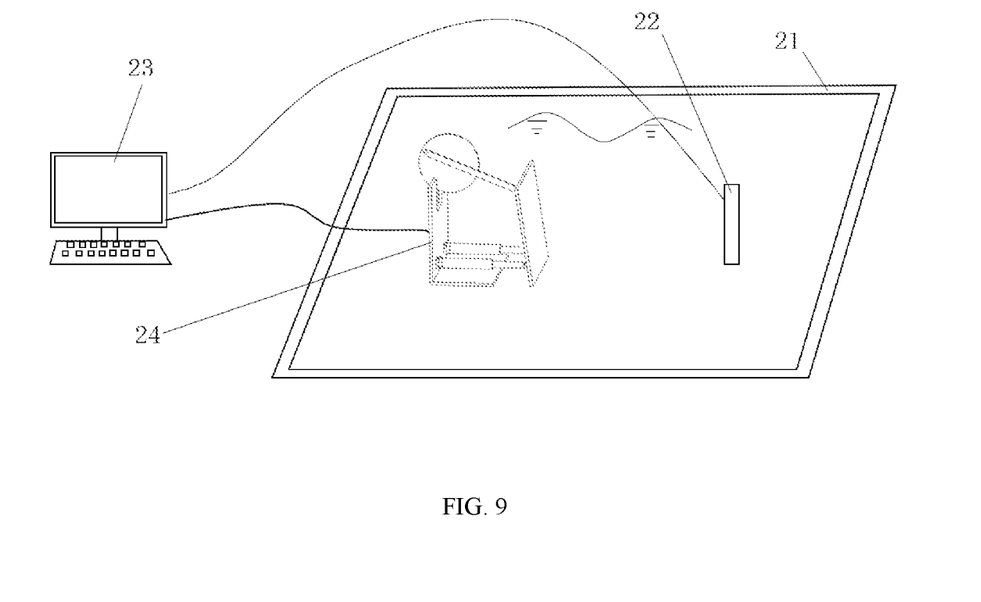
FIG. 9 is a schematic diagram showing the push-swing combined wave generator of the present invention in a typical application scenario.

FIG. 9 shows the wave generator 24 of the present invention employed in a typical application scenario: the wave generator 24 and a sensor 22 are placed in the wave-generating pool 21, and the sensor 22 collects wave data such as wave height in real time, and transmits the wave data to the computer 23, the computer 23 subsequently processes the wave data and issues instructions to the wave generator 24 to make adjustment to its motion.

Figure 7:
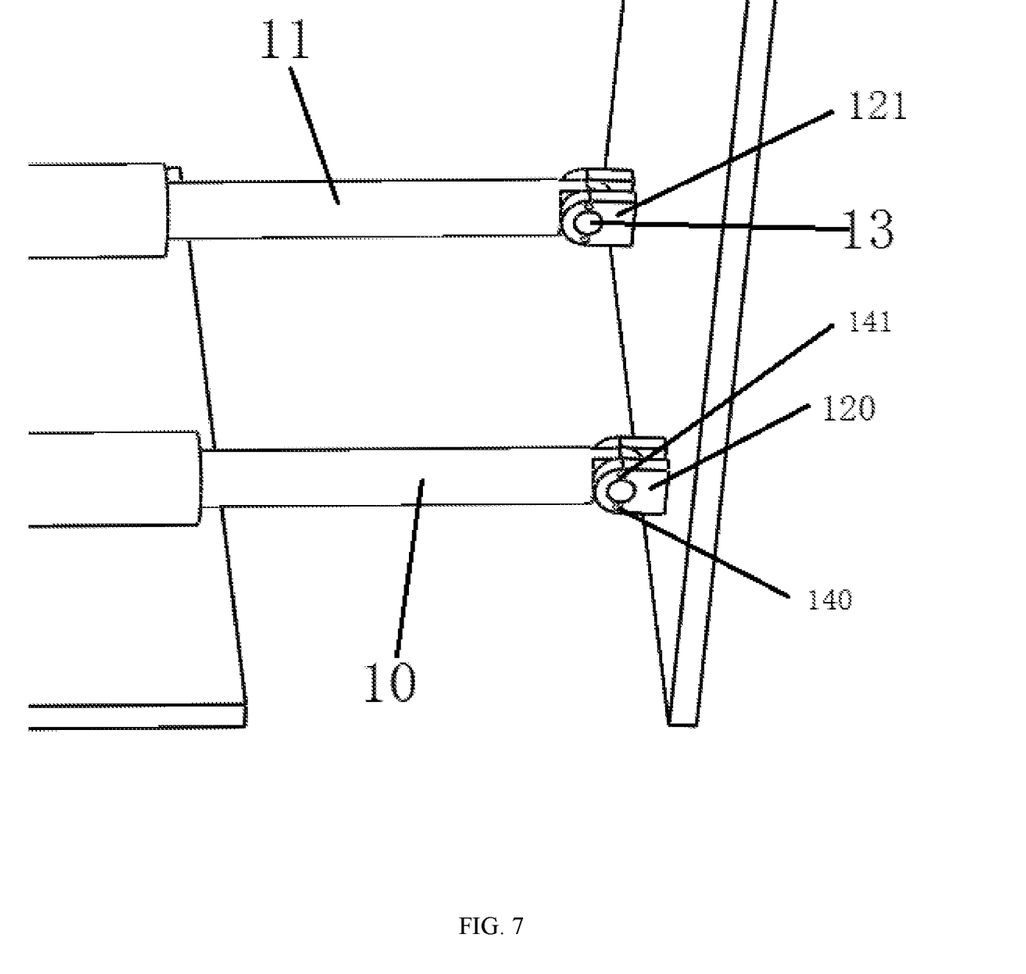
FIG. 7 is a schematic diagram showing positions of the sliding pins of the wave-generating plate of the push-swing combined wave generator of the present invention in push mode.
Figure 10:
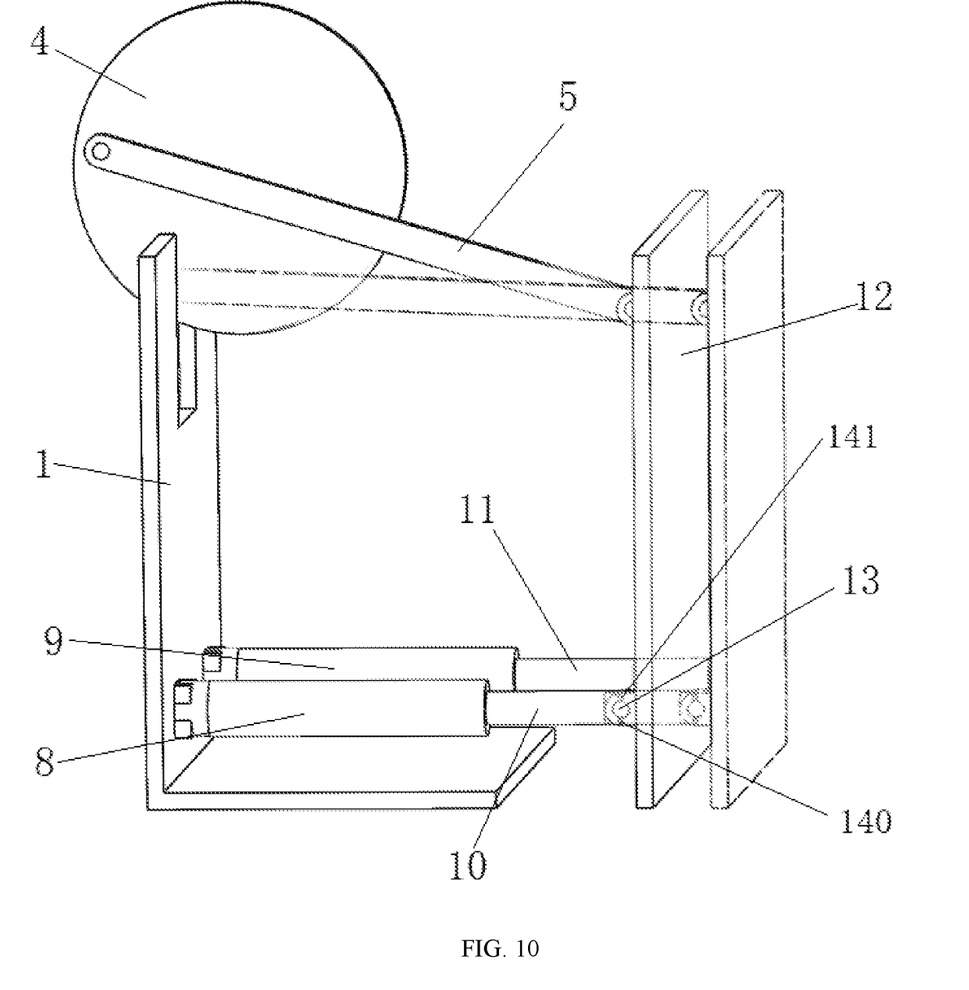
FIG. 10 is a schematic diagram depicting trajectory of the wave-generating plate of the push-swing combined wave generator of the present invention in push mode.

For wave generation in shallow water, horizontal push is preferred. In such a case, the sliding pins of the wave-generating plate 12 are switched to locked state, as shown in FIG. 7, so that the first hydraulic cylinder pushes rod 10 and the second hydraulic cylinder push rods 11 are fixedly connected with the wave-generating plate 12. The computer 23 processes the wave data and issues instructions accordingly to the servo motor controller to take action to drive the servo motor 3, the servo motor 3 then drives the driving wheel 4 to rotate, the driving wheel 4 drives the connecting rod 5 to move, and the connecting rod 5 pushes the wave-generating plate 12 to perform a reciprocating and translational motion to generate waves, as shown in FIG. 10.

Figure 8:
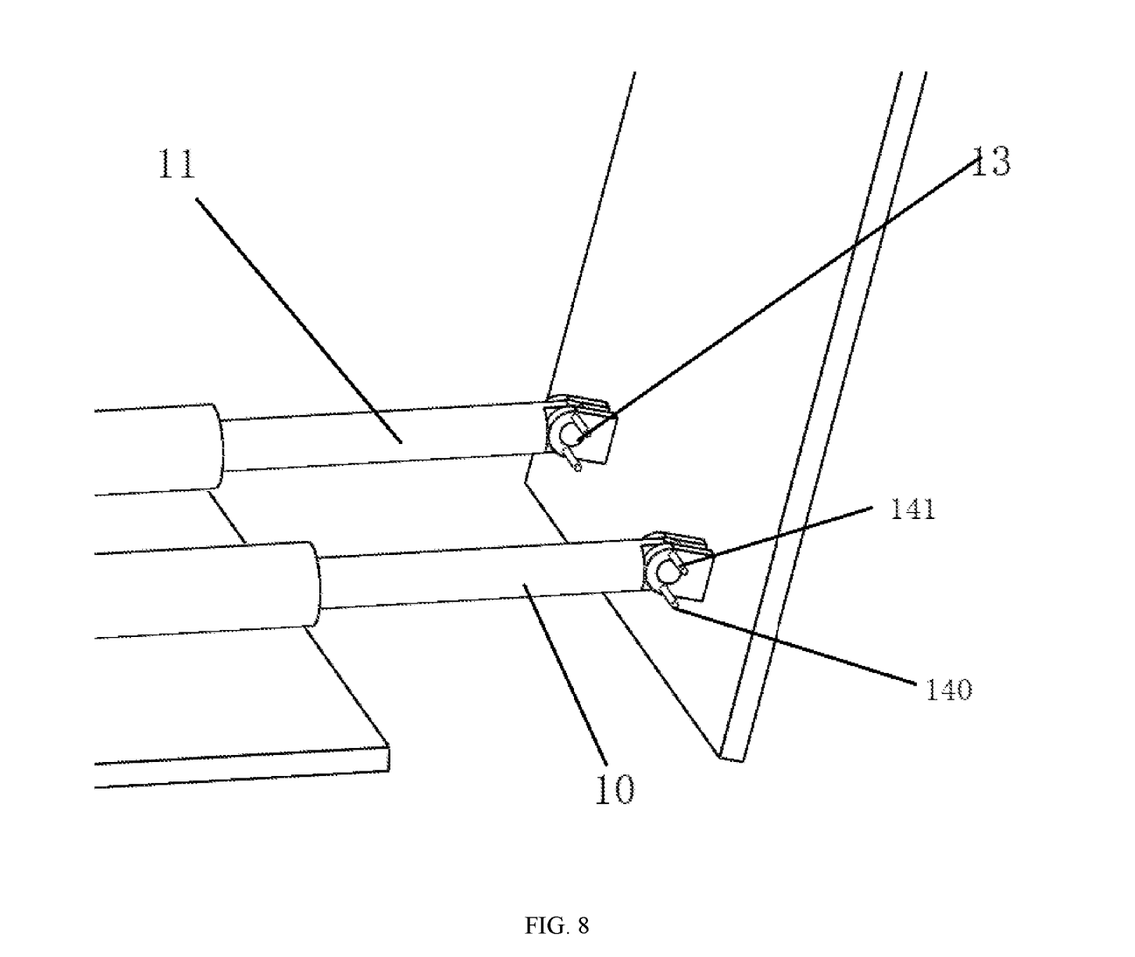
FIG. 8 is a schematic diagram showing positions of the sliding pins of the wave-generating plate of the push-swing combined wave generator of the present invention in swing mode.
Figure 11:
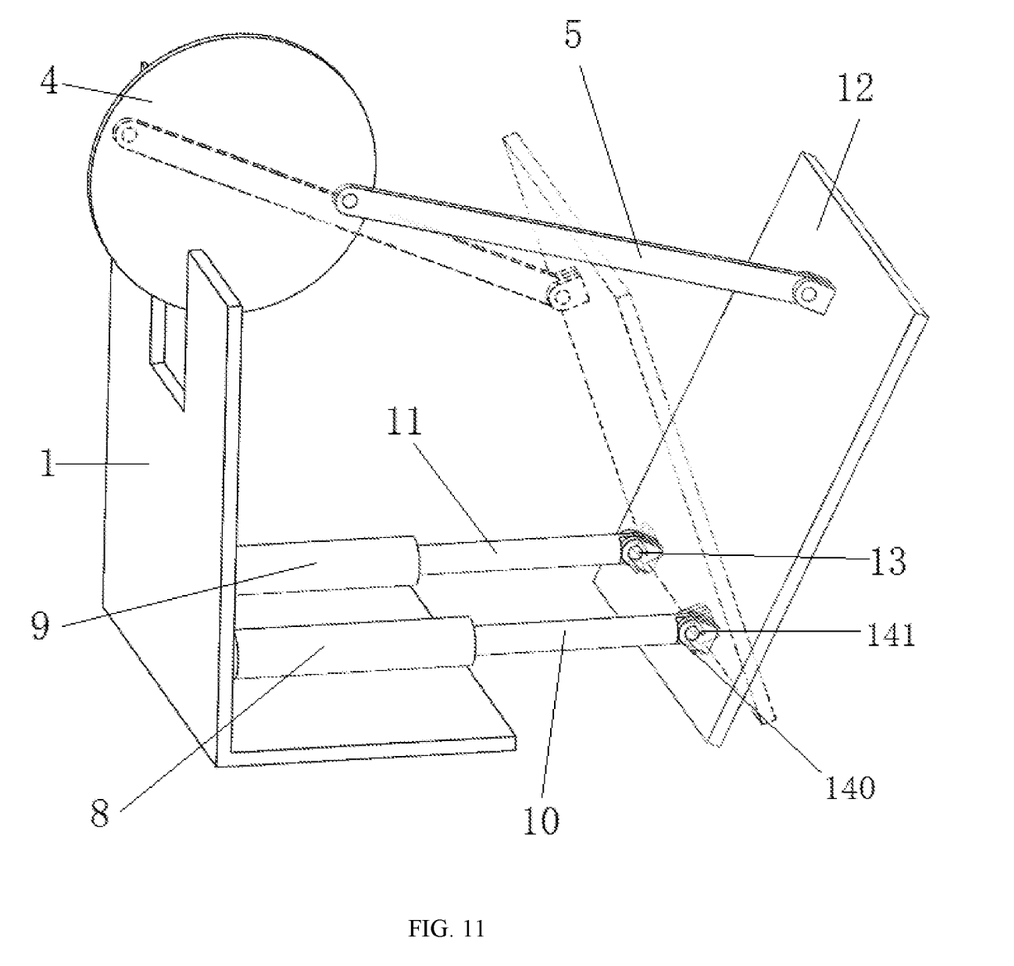
FIG. 11 is a schematic diagram depicting trajectory of the wave-generating plate of the push-swing combined wave generator of the present invention in swing mode.

For wave generation in deep water, swinging is preferred. In such a scenario, as shown in FIG. 8, the computer 23 issues instructions to the first hydraulic controlling component to control the first hydraulic cylinder 8 and simultaneously to the second hydraulic controlling component to control the second hydraulic cylinder 9, so that the first hydraulic cylinder push rod 10 and the second hydraulic cylinder push rod 11 remain stationary. The computer 23 subsequently calculates the length of AD. Next, the sliding pins of the wave-generating plate 12 are switched to an unlocked state (that is, they are plugged out of the respective sliding-pin through holes), so that the wave-generating plate 12 is capable to rotate. Subsequently, the computer 23 processes the wave data and issues instructions accordingly to the servo motor controller to take action to drive the servo motor 3, and the servo motor 3 drives the driving wheel 4 to rotate, the driving wheel 4 drives the connecting rod 5 to move, and the connecting rod 5 pushes the wave-generating plate 12 to rotate around the rotating pin of the wave-generating plate 12 to perform reciprocating swing movement. For various positions of the first hydraulic cylinder push rod 10 and the second hydraulic cylinder push rod 11, the wave-generating plate 12 will generate waves with various swing amplitudes, as shown in FIG. 11.

For horizontal push wave generation, in addition to the pushing force from the connecting rod 5, the wave-generating plate 12 also receives force from the first hydraulic cylinder push rod 10 and the second hydraulic cylinder push rod 11. With the coupled exertion of force from the two push rods, an increased driving force is obtained.

Further, by controlling the frequency, speed and stroke of the motion of the wave-generating plate 12, waves with different wave heights, wavelengths, and periods are generated.

Obviously, those skilled in the art is capable of making various changes and modifications to the present invention without departure from the spirit and scope of the present invention, which shall fall within the scope of the present invention.

We claim:

1. A push-swing combined wave generator, comprising a wave-generating fixing bracket (1), a servo motor (3), a driving wheel (4), a connecting rod (5), a first hydraulic cylinder (8), a second hydraulic cylinder (9), a first hydraulic cylinder push rod (10), a second hydraulic cylinder push rod (11), and a wave-generating plate (12);

the wave-generating fixing bracket (1) is L-shaped and consists of a bottom plate and a vertical plate;

the bottom plate is horizontally arranged on a floor; the vertical plate is perpendicular to the bottom plate and has a rectangular notch arranged on an upper part of the vertical plate, with a depth of the rectangular notch being $\frac{1}{5}$-$\frac{1}{2}$ of a height of the vertical plate;

the servo motor (3) is fixed on the upper part of the vertical plate and between the rectangular notch and a vertical side of the vertical plate, with a driving shaft thereof facing the rectangular notch;

the driving wheel (4) is arranged in the rectangular notch and is perpendicular to the vertical plate, with a rotating shaft in a center thereof connected with the driving shaft of the servo motor (3);

a boss is arranged on the driving wheel (4), with a center of the boss being $\frac{1}{2}$-$\frac{9}{10}$ of a radius of the driving wheel distanced from the center of the driving wheel, and a diameter thereof being $\frac{1}{30}$-$\frac{1}{10}$ of a diameter of the driving wheel (4);

a through hole is arranged on each end of the connecting rod (5), with the boss of the driving wheel (4) inserted into one of the though holes to form a rotating pair;

the first hydraulic cylinder (8) and the second hydraulic cylinder (9) each is arranged on the vertical plate $\frac{1}{8}$~$\frac{1}{2}$ of a height of the vertical plate distanced from the bottom plate, and $\frac{1}{8}$~$\frac{1}{2}$ of a width of the vertical plate distanced from a respective side of the vertical plate;

one end of the first hydraulic cylinder push rod (10) is inserted in the first hydraulic cylinder (8), while a side surface of another end thereof away from the vertical plate is arranged with a rotating-pin through hole, a lower sliding-pin through hole and an upper sliding-pin through hole; the lower sliding-pin through hole and the upper sliding-pin through hole of the first hydraulic cylinder push rod (10) are symmetrical in respect to the rotating-pin through hole thereof; one end of the second hydraulic cylinder push rod (11) is inserted in the second hydraulic cylinder (9), while a side surface of another end thereof away from the vertical plate is arranged with a rotating-pin through hole, a lower sliding-pin through hole and an upper sliding-pin through hole; the lower sliding-pin through hole and the upper sliding-pin through hole of the second hydraulic cylinder push rod (11) are symmetrical in respect to the rotating-pin through hole thereof;

a pair of first U-shaped bosses (120) are arranged horizontally and symmetrically spacedly apart on a lower part of the wave-generating plate (12), with said each first U-shaped boss (120) having a rotating-pin through hole, a lower sliding-pin through hole and an upper sliding-pin through hole arranged there-through; the rotating-pin through hole of said each first U-shaped boss (120) corresponds and matches that on the first hydraulic cylinder push rod (10), the lower sliding-pin through hole of said each first U-shaped boss (120) corresponds and matches that on the first hydraulic cylinder push rod (10), and the upper sliding-pin through hole of said each first U-shaped boss (120) corresponds and matches that on the first hydraulic cylinder push rod (10); the end of the first hydraulic cylinder push rod (10) away from the vertical plate is entrenched in a space between the two first U-shaped bosses (120); a rotating pin (13) runs through the rotating-pin through holes of the two first U-shaped bosses (120) and that of the first hydraulic cylinder push rod (10) to form a rotating pair; a lower sliding pin (140) and an upper sliding pin (141) are simultaneously insertable into the lower sliding-pin through holes of the two first U-shaped bosses (120) and that on the first hydraulic cylinder push rod (10) and into the upper sliding-pin through holes of the two first U-shaped bosses (120) and that on the first hydraulic cylinder push rod (10) respectively, to form a sliding pair;

a pair of second U-shaped bosses (121) are arranged horizontally and symmetrically spacedly apart on the lower part of the wave-generating plate (12), with said each second U-shaped boss (121) having a rotating-pin through hole, a lower sliding-pin through hole and an upper sliding-pin through hole arranged there-through; the rotating-pin through hole of said each second U-shaped boss (121) corresponds and matches that on the second hydraulic cylinder push rod (11), the lower sliding-pin through hole of said each second U-shaped boss (121) corresponds and matches that on the second hydraulic cylinder push rod (11), and the upper sliding-pin through hole of said each second U-shaped boss (121) corresponds and matches that on the second hydraulic cylinder push rod (11); the end of the second hydraulic cylinder push rod (11) away from the vertical plate is entrenched in a space between the two second U-shaped bosses (121); a rotating pin runs through the rotating-pin through holes of the two second U-shaped bosses (121) and that of the second hydraulic cylinder push rod (11) to form a rotating pair; a lower sliding pin (140) and an upper sliding pin (141) are simultaneously insertable into the lower sliding-pin through holes of the two second U-shaped bosses (121) and that on the second hydraulic cylinder push rod (11) and into the upper sliding-pin through holes of the two second U-shaped bosses (121) and that on the second hydraulic cylinder push rod (11) respectively, to form a sliding pair;

a distance from a center line between the two first U-shaped bosses (120) to a center line between the two second U-shaped bosses (121) is equal to a distance between a center line of the first hydraulic cylinder (8) and a center line of the second hydraulic cylinder (9);

a pair of third U-shaped bosses (122) are arranged horizontally and symmetrically spacedly apart on an upper part of the wave-generating plate (12), with a center line between the two third U-shaped bosses (122) corresponding with a center line of the wave-generating plate (12); said each third U-shaped boss (122) has a rotating-pin through hole arranged there-through; another end of the connecting rod (5) away from the vertical plate is entrenched in a space between the two third U-shaped bosses (122); a rotating pin runs through the rotating-pin through holes of the two third U-shaped bosses (122) and the through hole on the end of the connecting rod (5) away from the vertical plate to form a rotating pair;

the driving wheel (4), the connecting rod (5), the wave-generating plate (12), the first cylinder push rod (10), and the second cylinder push rod (11) satisfy the following condition: on a plane where the driving wheel (4) is located, denoting a central axis of the driving wheel (4) as A, denoting a central axis of the boss on the driving wheel (4) as B, denoting a central axis of the hinged connection between the connecting rod (5) and the wave-generating plate (12) as C, and denoting a central axis of the hinged connection between either the first or the second hydraulic cylinder push rod (10, 11) and the wave-generating plate (12) as D, then AB is always shortest among AB, BC, CD, and AD, and a sum of AB with a longest among BC, CD, and AD is not less than a sum of other two from BC, CD, and AD excluding said longest.

2. The push-swing combined wave generator of claim 1, wherein the push-swing combined wave generator further comprises a computer, a controller for controlling the servo motor, a first hydraulic controlling component for controlling the first hydraulic cylinder, and a second hydraulic controlling component for controlling the second hydraulic cylinder.

* * * * *